(12) United States Patent
Fisher et al.

(10) Patent No.: US 7,492,841 B2
(45) Date of Patent: Feb. 17, 2009

(54) RELATIVE PHASE/AMPLITUDE DETECTION SYSTEM

(75) Inventors: Barry Mark Fisher, Dallas, TX (US); Jonathon C. Veihl, McKinney, TX (US); Jeramy Scott Leonard, Sachse, TX (US); Donald G. Jackson, Garland, TX (US)

(73) Assignee: Andrew Corporation, Westbrook, IL (US)

( * ) Notice: Subject to any disclaimer, the term of this patent is extended or adjusted under 35 U.S.C. 154(b) by 643 days.

(21) Appl. No.: 10/354,878

(22) Filed: Jan. 30, 2003

(65) Prior Publication Data

US 2004/0151265 A1  Aug. 5, 2004

(51) Int. Cl.
*H04B 7/10* (2006.01)
(52) U.S. Cl. .................. 375/347; 375/347; 455/132; 455/296; 342/371
(58) Field of Classification Search .................. 375/347
See application file for complete search history.

(56) References Cited

U.S. PATENT DOCUMENTS

| | | | | |
|---|---|---|---|---|
| 3,787,863 A | * | 1/1974 | Watanabe et al. | 342/424 |
| 3,806,658 A | * | 4/1974 | Anderson et al. | 348/14.1 |
| 4,220,954 A | * | 9/1980 | Marchand | 342/433 |
| 4,626,858 A | | 12/1986 | Copeland | 342/374 |
| 5,128,966 A | | 7/1992 | Bang | 375/82 |
| 5,355,101 A | * | 10/1994 | Ichihara et al. | 332/103 |
| 5,365,280 A | * | 11/1994 | De Haan et al. | 348/699 |
| 5,604,462 A | * | 2/1997 | Gans et al. | 330/124 R |
| 5,732,109 A | | 3/1998 | Takahashi | 375/326 |
| 6,016,304 A | * | 1/2000 | Kyle et al. | 370/206 |
| 6,058,318 A | * | 5/2000 | Kobayakawa et al. | 455/562.1 |
| 6,115,431 A | | 9/2000 | Lee | 375/324 |
| 6,133,860 A | | 10/2000 | Ryu et al. | |
| 6,133,868 A | | 10/2000 | Butler et al. | |
| 6,215,819 B1 | | 4/2001 | Hyakudai et al. | 375/240 |
| 6,239,747 B1 | * | 5/2001 | Kaminski | 342/442 |
| 6,246,674 B1 | | 6/2001 | Feuerstein et al. | 370/334 |
| 6,320,540 B1 | | 11/2001 | Meredith | |
| 6,327,481 B1 | * | 12/2001 | Nagashima | 455/562.1 |
| 6,351,497 B1 | | 2/2002 | Suzuki et al. | 375/259 |
| 2002/0135513 A1 | * | 9/2002 | Paschen et al. | 342/371 |
| 2004/0032365 A1 | * | 2/2004 | Gotti et al. | 342/368 |

\* cited by examiner

*Primary Examiner*—Juan A Torres
(74) *Attorney, Agent, or Firm*—Wood, Herron & Evans, LLP

(57) ABSTRACT

A base station signal is applied to antenna elements. One signal from a first element is electrically modified and evaluated in conjunction with a second, unmodified signal from a second element. The modified signal is further modified and again evaluated with the unmodified signal. The results of the two evaluations are compared to determine a relative phase and/or amplitude at the respective elements.

66 Claims, 4 Drawing Sheets

RELATIVE PHASE/AMPLITUDE DETECTION SYSTEM

FIELD OF THE INVENTION

This invention relates generally to signal wave propagation, and more particularly, to antenna signal pattern shaping and detection.

BACKGROUND OF THE INVENTION

Wave propagation generally regards the travel of a signal from one antenna to another. Telecommunication network providers must carefully configure signal wave propagation characteristics at each antenna of a network to ensure desired signal coverage. Moreover, providers must routinely change radiation patterns to accommodate changing customer requirements and network availability.

To this end, providers must monitor or otherwise predict wave propagation to ensure efficient and effective coverage. Despite advances in areas of wave propagation control, however, devices and techniques for monitoring signal phase and amplitude remain imprecise, slow and costly. Such drawbacks often translate into coverage gaps, power wastage and diminished effectiveness.

Consequently, there is a need to accurately monitor waveform propagation in a manner that avoids the uncertainty and processing drawbacks of existing phase detection practices.

BRIEF DESCRIPTION OF THE DRAWINGS

The accompanying drawings, which are incorporated in and constitute a part of this specification, illustrate embodiments of the invention and, together with the detailed description given below, serve to explain the principles of the invention.

DETAILED DESCRIPTION OF THE DRAWINGS

Figure 1:
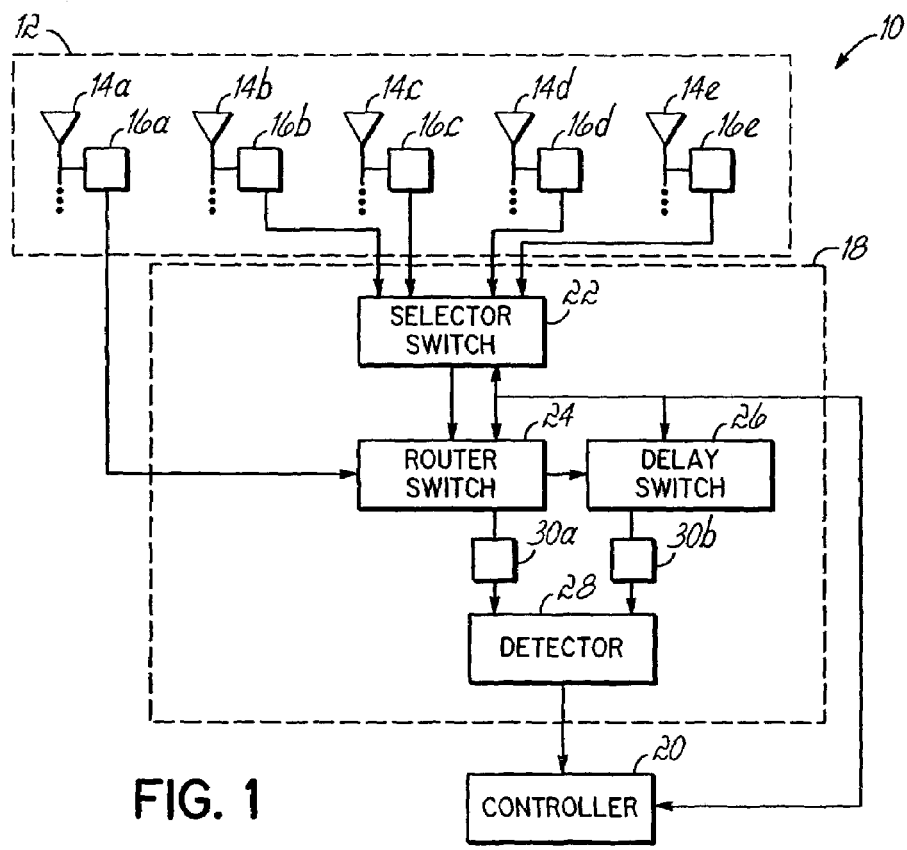
FIG. 1 a block diagram of a phase and amplitude detection system for purposes of explaining the principles of the present invention.

FIG. 1 shows an exemplary antenna system 10 for purposes of explaining the principles of the present invention. Antenna system 10 includes an antenna 12 having a plurality of radiating elements 14a-e. A signal from a base station (not shown) emanates from the radiating elements 14a-e. Each radiating element 14a-e couples via a respective coupler 16a-16e to a sensing network 18, which communicates with a controller 20. Sensing network 18 generates two sets of data correlated to separate elements of the plurality of radiating elements 14a-e, herein referred to as a reference 14a and a selected element 14b,c,d or e. The controller 20 evaluates these data sets to determine a relative phase and/or amplitude relationship between the reference and the selected element 14b,c,d or e.

To this end, the exemplary sensing network 18 includes a selector switch 22 that selectively directs the signal received at one of the radiating elements 14b-e to a router switch 24. As will be appreciated by one of skill in the art, the phase and amplitude of the signal varies respectively at each of the antenna elements 14a-e. The router switch 24 also connects to and receives a signal from the reference element 14a. The router switch 24 selectively outputs one of its received signals to a delay switch 26 and the other to detector 28. The delay switch 26 may selectively introduce a delay ranging from about 85 to about 95 degrees into the phase of its coupled signal prior to the coupled signal's arrival at the detector 28. The detector 28 receives the signals from the router switch 24 and the delay switch 26 and outputs data to the controller 20. Where desired for calibration or precautionary considerations, the transmission paths to the detector 28 may include pads 30a,b configured to attenuate the signals.

Figure 2:
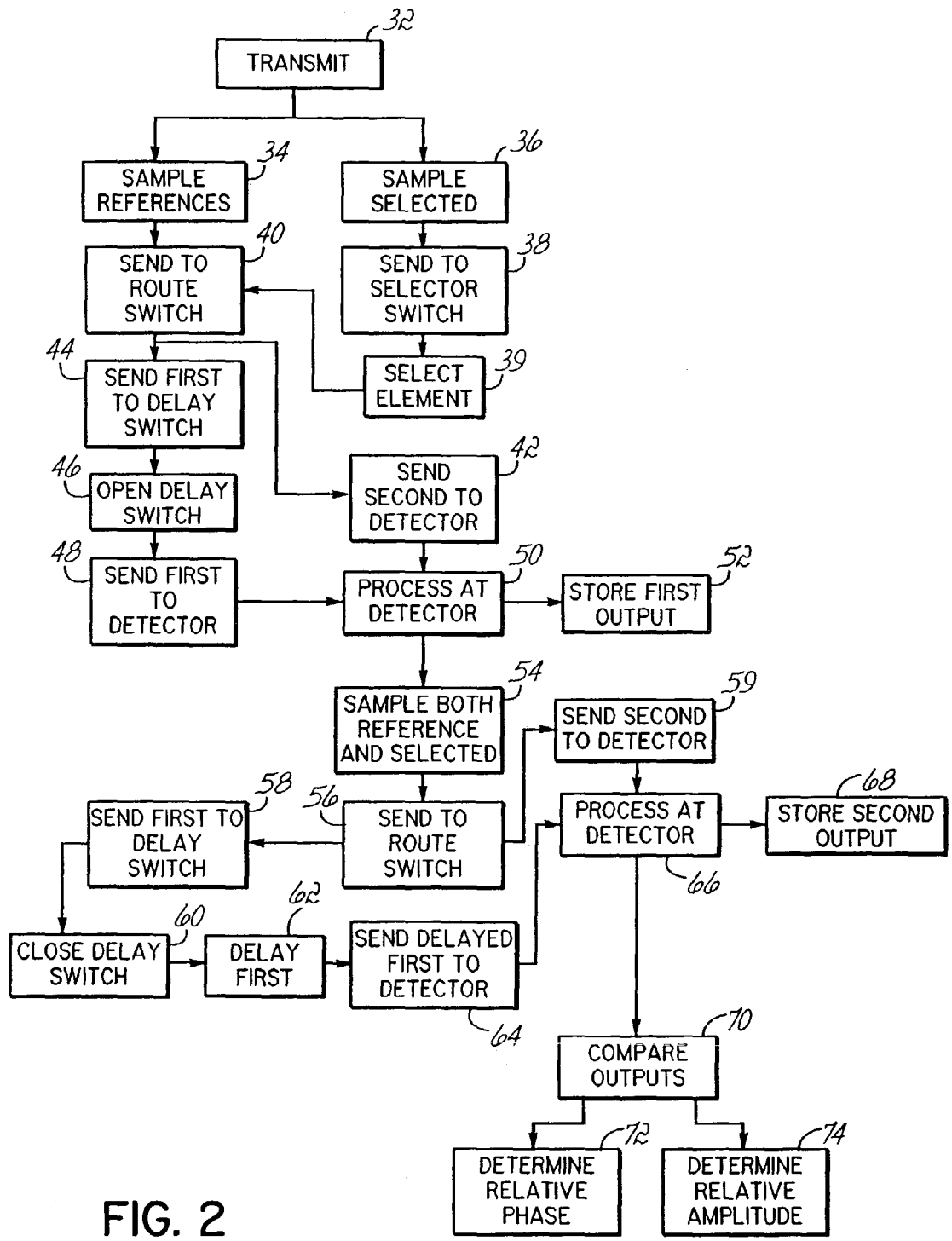
FIG. 2 is flowchart having sequenced steps suitable for execution within the detection system of FIG. 1.

The flowchart of FIG. 2 shows sequenced steps suitable for execution within the antenna system 10 of FIG. 1. A signal is applied to the antenna elements 14a-e at block 32. Received signals from the elements 14a-e may be sampled at blocks 34 and 36. The signal sampled at block 34 may include a reference signal that will be compared to one or more of the other signals. This reference signal may be sent directly to a router switch 24. The phase and amplitude of the reference signal may be unknown in certain applications.

At block 38, received signals 14b-e may arrive at a selector switch 22 configured to pass one of the signals on to the router switch 24 at block 40. Which element 14b-e is selected at block 39 may be determined according to an instruction from the controller 20, or may alternatively be hardwired in the selector switch 22. The controller 20 of one embodiment may sequence through selection of each of signals 14b-e in the course of multiple evaluations, until all desired relative phase/amplitude relationships are known.

A selector switch 22 in conformance with the principles of the present invention may include any device configured to multiplex, route, matrix, or select one or more input signals for output to another device. One of skill in the art will appreciate that the selector switch 22 may include as many inputs and outputs as appropriate for a particular application, for instance, according to element number.

The router switch 24 may send one of the reference or the selected signals to the detector 28 and the other to the delay switch 26 at blocks 42 and 44, respectively. The controller 20 may determine where each signal is sent per program protocol. The router switch 24 may alternatively be hardwired to send respective signals presented at preset ports to predetermined destinations.

If the delay switch 26 is disconnected at block 46, then the signal sent to the delay switch 26 is passed without substantial delay to the detector 28 at block 48. At the detector 28, the two signals are processed at block 50 to output a first evaluation. This output may be stored at block 52.

The respective signals from the elements 14a-e may be sampled as before at blocks 54, with the selector switch 22 again selecting the same selected signal to send to the router switch 24 at block 56 or the delay switch 26 at block 58. At block 60, the controller 20 may initiate closure of the delay switch 26. The connected delay switch 26 may delay the phase of the selected signal by about eighty-five to about ninety-five degrees at block 62 prior to arriving at the detector 28 at block 64.

A suitable detector 28 may include a gain/phase detector as is known in the art and commercially available. As such, embodiments of the present invention may be realized in the absence of highly specialized and priced equipment. In so doing, an embodiment of the present invention capitalizes on the known functionality of conventional gain/phase detectors to compare the outputs of different evaluations to determine the relative phase and/or amplitude relationship.

A detector 28 conforming to the principles of the present invention outputs a signal representative of the relative amplitude and/or phase of the input signals. For instance, the detector 28 may generate a sinusoidal output correlated to a difference in amplitude and phase between the two signals. Some ambiguity may apply to the phase measurement, as the detector 28 may have phase limitations that prevent it from scanning more than 180 degrees during an evaluation process. This limitation may prevent a user from knowing with certainty if the relative phase is positive or negative. However, processes of the present invention eliminate such uncertainty by performing an additional evaluation, in which the phase of one of the signals is delayed by a known amount at the delay switch 26. The controller 20 may conjunctively process these evaluations to determine both the amount and the sign of the phase difference.

The phase of the signal that does not pass through the delay switch 26 is constant for both evaluations, so program code executing on the controller 20 uses the measured difference between the evaluations to determine the sign of the phase. To this end, a delay switch 26 may comprise a device configured to selectively preserve or alter the phase of an arriving signal. For example, a suitable delay switch 26 includes a commercially available dual single pole double throw switch that passes an incoming single (without introducing a substantial delay) when disconnected, and delays the signal by routing the signal along a path with a delay of about eighty-five to about ninety-five degrees when connected.

The detector 28 processes the reference and delayed signal to produce a second evaluation output at block 66. The controller 20 may optionally store the second output at block 68 for future processing. At block 70, the controller 20 may recall the stored outputs and comparatively process them to determine at least one of the relative phase and amplitude of the two signals. The controller 20 may subsequently store the relative phase/amplitude relationship for output to a user at blocks 72 and/or 74. The controller 20 may further initiate another determination using another of the selected signals sampled at block 36.

While the controller 20 of one embodiment may sequentially execute the evaluations, the controller 20 of another embodiment may simultaneously conduct the evaluations. To this end, the system 10 may include multiple detectors (not shown). An exemplary controller 20 may incorporate analog to digital conversion hardware/software. Additionally, all hardware and electrical paths shown in FIG. 1 may be calibrated during assembly to account for any delay introduced as a result of sending one of the signals to the delay switch path, irrespective of whether the delay switch 26 is disconnected or connected. Moreover, delays associated with signal travel throughout any of the components of any embodiment of the present invention may be calibrated and otherwise accounted for in phase/amplitude determinations. Furthermore, where the phase and/or amplitude of one of the selected signals is known, the controller 20 may perform processing to determine an absolute phase and/or amplitude for a selected signal.

While the steps of the flowchart of FIG. 2 are illustrative of one embodiment of the present invention, one of skill in the art will appreciate that certain of the steps of this flowchart, as well as those of the one that follows, may be augmented, rearranged or omitted per system requirements. Many of these steps may further execute simultaneously where desirable. Moreover, phase and amplitude determinations according to the underlying principles of the present invention may be accomplished while the antenna is transmitting or receiving.

Figure 3:
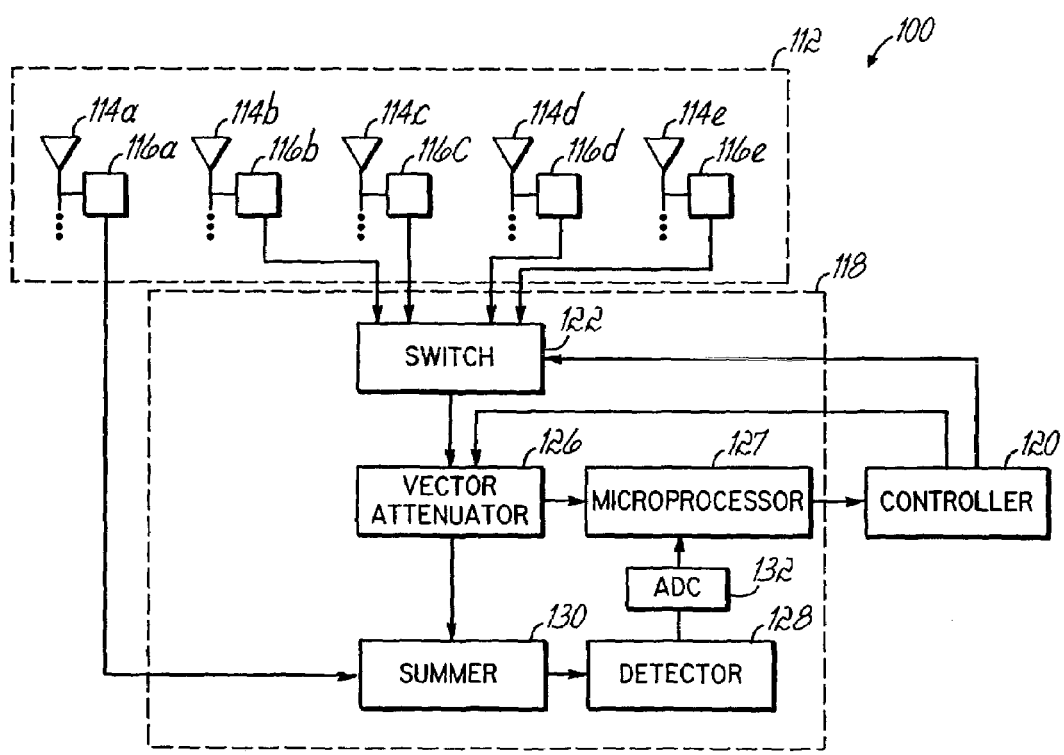
FIG. 3 is a block diagram of vector attenuator based relative phase and amplitude detection system for purposes of explaining the principles of the present invention.

FIG. 3 shows another embodiment of an antenna system 100 suited for explaining the principles of the present invention. Antenna system 100 includes an antenna 112 having a plurality of radiating elements 114*a-e*. As with the above embodiment, more or fewer elements 114*a-e* may be used per application specifications. The elements 114*a-e* couple to a sensing network 118 via couplers 116*a-e*. A controller 120 communicates with the sensing network to determine a relative phase and/or amplitude relationship between signals applied to the elements 114*a-e*.

The sensing network 118 includes a switch 122 that connects to the antenna elements 114*a-e* and a vector attenuator 126, as well as a microprocessor 127. The vector attenuator 126, in turn, feeds a summer 130 and communicates with the microprocessor 127. A detector 128 receives output from the summer 130. The detector 128 of FIG. 3 additionally communicates with the microprocessor 127 via an analog-to-digital converter 132.

Generally, the detector 128 measures the summed amplitude of an applied reference signal from antenna 114*a* and the sequentially selected transmitted signal emanating from antenna elements 114*b-e*. Time sequential selection of elements 114*b-e* is accomplished with a switch 122. The vector attenuator 126 adjusts the phase and amplitude of the signal from the selected element, until the lowest amplitude of the summed output is determined. The microprocessor 127 then determines the relative phase and amplitude of the selected element signal.

More particularly, couplers 116*a-e* may sample a portion of a signal emanating from antenna elements 114*a-e* (or alternatively, each column) of an antenna 112. As with the above discussed embodiment, one of skill in the art will appreciate that any number of elements may be used in accordance with the underlying principles of the present invention, as well as elements including multiple polarizations.

Figure 4:
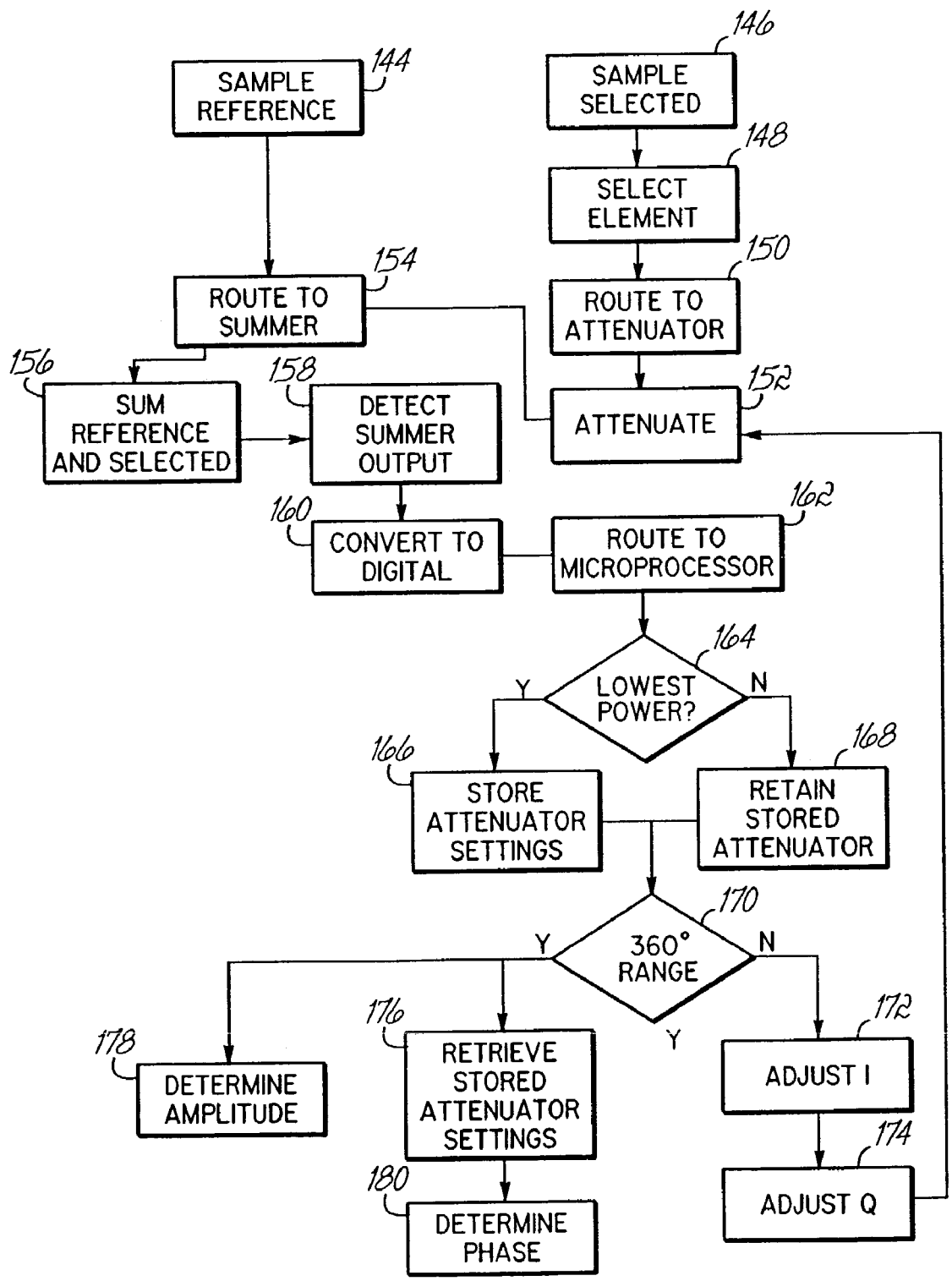
FIG. 4 is flowchart having sequenced steps suitable for execution within the detection system of FIG. 3.

The flowchart of FIG. 4 illustrates exemplary process steps suitable for execution within the antenna system 100 of FIG. 3. Generally, the steps embody one method of determining a relative phase and amplitude relationship between two elements 114*a-e*. In operation, portions of a signal emanating from the elements 114*a-e* are sampled at blocks 144 and 146. The signal from the reference element 114*a* is routed directly to the summer 130 at block 154. While the summer 130 generally includes any device configured to add the respective amplitudes of two or more signals, other devices consistent with the principles of the invention will merely produce an output that varies as a product of the relative phases of the signals.

The switch 122 at block 148 may select one signal from sampled signals 114*b-e*. The switch 122 routes the selected signal 114*b* to the vector attenuator 126 (block 150), where it is attenuated and phase shifted at block 152. An exemplary vector attenuator 126 may attenuate the incoming signal according to an I (real/in-phase) input and a Q (imaginary/quadrature) input of the vector attenuator 128. Program code executing at the microprocessor 127 may initiate adjustment the I and Q inputs of the vector attenuator 126 as appropriate. One of skill in the art will recognize that other attenuators consistent with the principles of the present invention may comprise a device configured to adjust phase and/or amplitude of a signal. In any case, the attenuated signal is then routed to the summer 130 at block 154 and summed with the reference signal 114*a* at block 156.

An analog-to-digital converter 132 (block 160) processes the output from the power detector 128 (block 158) prior to arrival at the microprocessor 127 (block 162). The microprocessor 127 may determine if the detected, summed amplitude is at its lowest at block 164. If so, then the microprocessor 127 may record the attenuator settings at block 166. Alternatively, if the lowest power reading is not realized in conjunction with the current vector attenuator settings, then the microprocessor 127 may retain the previously stored setting that corresponds to the lowest detected power measurement.

The microprocessor 127 may continue to adjust the vector attenuator settings at blocks 172 and 174 until the vector attenuator 126 has processed through the entire cycle of the selected signal at block 170. At such time as the lowest summer power reading is established, the microprocessor 127 retrieves the corresponding settings of the vector attenuator 126 (block 176). These settings may be used to determine the phase of the selected signal. For instance, the microprocessor 127 may add 180 degrees to the attenuator setting. Where desired, the amplitude of the selected signal may be determined by processing the output of the summer 130 in conjunction with the known amplitude of the reference element signal. After thus determining the relative phase (block 180) and amplitude (block 178) of the selected signal, the antenna system 100 may repeat the processes of the flowchart of FIG. 4 for another selected element 114*c-e*.

Figure 5:
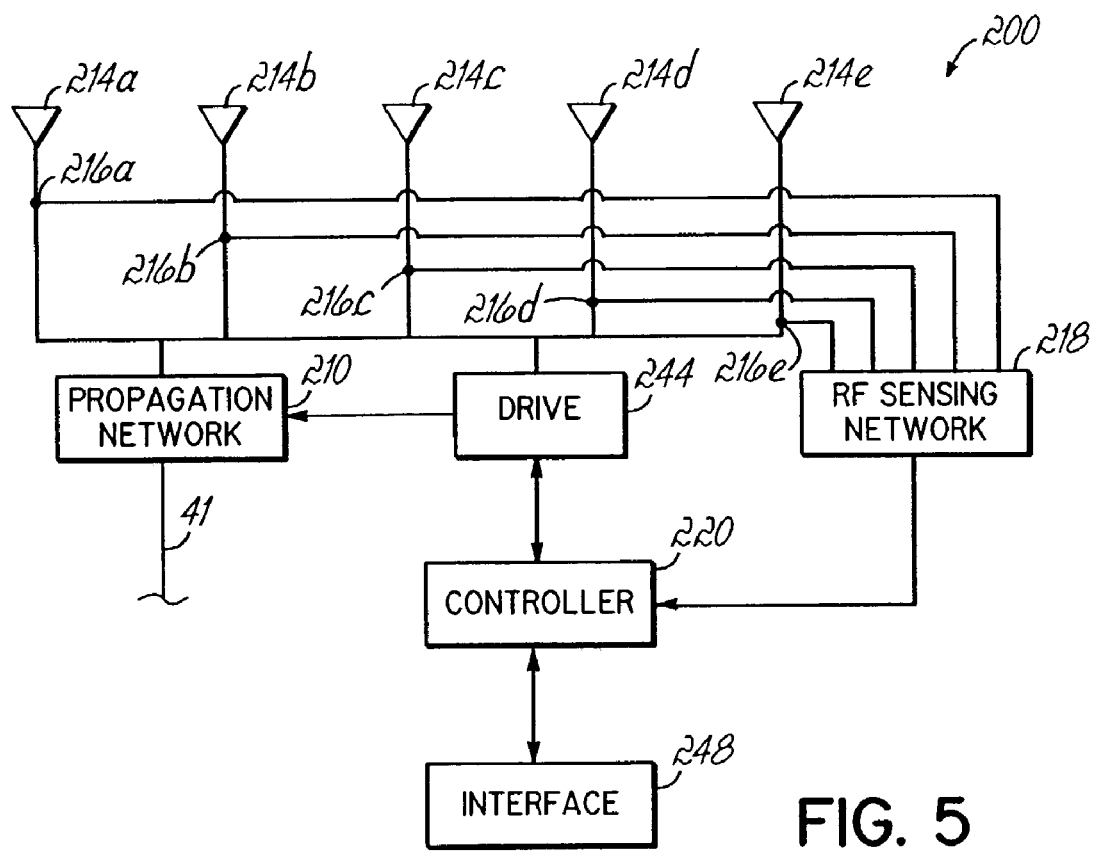
FIG. 5 is a block diagram of an antenna environment for purposes of explaining the principles of the present invention.

FIG. 5 is a block diagram of an antenna system 200 configured to automatically determine a relative phase and/or amplitude relationship between antenna elements 214*a-e*. To that end, the exemplary antenna system 200 may use output from a sensing network 218 consistent with the above discussed embodiments to realize new beamwidths and azimuth scan angles. More particularly, output drives a propagation network 210 comprising ganged or independently operated phase shifters, in addition to feed lines, amplifiers and power control devices. The phase shifters may vary the phase of a signal transmitted from one or more elements 214*a-e* to affect the beamwidth and/or azimuth scan angle. Similarly, a suitable propagation network 210 may include power dividers configured to apportion power to the elements 214*a-e*, thereby realizing a desired scan angle or beamwidth. In any case, the propagation network 210 comprises any device configured to affect wave propagation from one or more of the columns.

Where desired, the propagation network 210 may communicate with one or more drives 244 configured to automatically control operation of the network 210. For example, a motor may drive one or more phase shifters or power dividers of the propagation network 210. The drive 244 of FIG. 5 responds to instructions from a controller 220. While the controller 220 may include a transistor, computer or network of computers, a suitable controller for purposes of this specification need minimally be able to receive an incoming signal and output an instruction. Moreover, the controller 220 may be removable from the system 200. For example, a technician may carry around a laptop computer or hand held processing device to different worksites.

To this end, the controller 220 may communicate with or include a user interface 248. An exemplary user interface 248 includes a computer monitor and/or keypad, switches, dials, a microphone, as well as a LED display or other conventional display or input device. The user may monitor and/or control operation of the antenna system 200 through the interface 248.

As shown in FIG. 5, the controller 220 additionally receives input from a sensing network 218. The sensing network 218 outputs a communication indicative of the relative phase and/or amplitude relationship between any two elements 114*a-e*. The controller 220 of one embodiment automatically adjusts wave propagation of the antenna via the drive 244 in response to the communication. For example, the controller 220 may correlate the communication to a motor setting necessary to bring about a desired change in beamwidth or azimuth scan angle.

Prior to transmitting the communication to the controller 220, the sensing network 218 obtains signals from the antenna elements 214*a-e*. For example, couplers 216*a-e* may sample a portion of an applied signal at each element 214*a-e*. The coupled signals correlate to a signal that has been applied to the elements 214*a-e*. As discussed in greater detail in the text below, the sensor network 218 electrically modifies a first of the signals, which it subsequently evaluates in conjunction with a second, unmodified signal from another element 214*a-e* (or column, if alternatively determining a relationship between columns). The sensing network 218 of FIG. 5 further modifies the first signal and may repeat the same evaluation processes with the second, unmodified signal. The sensing network 218 compares the results of the two evaluations and generates a communication signal reflective of the comparison.

While five antenna elements are shown in FIGS. 1, 3 and 5, one of skill in the art will recognize that more or fewer elements could be used in accordance with the principles of the present invention. Moreover, while a sensing network 218 of one embodiment may determine a relative phase and/or amplitude relationship between antenna elements 214*a-e*, that of another embodiment alternatively or additionally determines a relationship between respective antenna columns or antennas. In such a case, element number and configuration may be relatively unimportant.

Thus in operation, the above embodiments initially apply a signal to elements comprising one or more elements of an antenna to determine a relative phase and/or amplitude relationship. One signal received in response from a first element of a column is electrically modified and evaluated in conjunction with a second, unmodified signal from a second element from the same or different column. The modified signal is further modified and again evaluated along with the unmodified signal. The system then compares the results of the two evaluations to determine a relative phase and/or amplitude of the signal at the respective elements.

More particularly, a signal is applied to elements that are to undergo a phase and/or amplitude evaluation in accordance with an embodiment of the present invention. An acceptable signal for purposes of this specification may comprise any electromagnetic energy, to include simultaneous transmissions having multiple originating sources. Signals received from the elements in response to the signal may be conjunctively processed and compared to determine a relative phase and/or amplitude relationship.

Processing includes electrically modifying the first of the received signals. For instance, the system may delay or attenuate the first signal using hardware and methodology as described above. The antenna system generates a first set of data correlated to both the modified and a second received signal. For example, a system of one embodiment of the present invention processes both signals at inputs of a gain/phase detector. Data generated according to another embodiment includes an amplitude measurement of the combined signals. The antenna system may store the first set of data for later use.

The antenna system further electrically modifies the first signal. For instance, the first signal may undergo a delay or attenuation as above. While this further modification is typically accomplished subsequent to the above discussed electrical modification, one of skill in the art will appreciate that it may be accomplished simultaneous with the first where desired. Moreover, the same measurement of the first signal may be used for each modification process, or alternatively, separate measurements of the first signal may be accomplished.

In any case, the antenna system generates a second set of data corresponding to the second received signal and the further electrically modified first signal. Exemplary second data sets may comprise electronic output from a power or gain/phase detector. A controller of the antenna system may compare this second set of data and to the first, recalled from memory, to determine a relative phase and/or amplitude relationship between the elements or columns.

By virtue of the foregoing, there is thus provided a system for determining the relative phase and amplitude of respective antenna elements without the cost, time delay and processing drawbacks associated with known mechanisms. While the present invention has been illustrated by the description of embodiments thereof, and while the embodiments have been described in considerable detail, it is not the intention of applicants to restrict or in any way limit the scope of the appended claims to such detail.

For instance, while the automatic adjustment of phase shifters, power dividers and or additional phase control devices of the propagation network via motors as discussed herein may be particularly applicable in certain situations, one of skill in the art will recognize that output from sensing network is equally useful where users manually steer antenna beams, to include physical replacement or rearrangement of antenna columns. A sensing network of another embodiment communicates with the electronics of a smart antenna. Still another application in accordance with the principles of the present invention may use output from the sensing network in cellular demodulation processes.

Moreover, program code incident on the controller 220 of FIG. 5 may supplant or augment operation of the sensing network 218. That is, where properly calibrated, the controller 220 may correlate motor settings to a lookup table having antenna pattern information. The detected motor settings may correlate to wave propagation data in the table useful in ascertaining beamwidth and azimuth scan angle, for instance.

Additional advantages and modifications will readily appear to those skilled in the art. Embodiments of the present invention may be utilized in conjunction with both transmit/ receive antennas, as well as those of a transmit-only design. "Coupled" has been used in the specification interchangeably with "received." Other applications of the present invention may involve digital demodulation circuits in cellular systems. Further, the present invention is not limited in the type of radiating elements used. Any type of radiating elements may be used, as appropriate. The invention is also not limited in the number of rows of radiating elements, nor does it necessitate rows, per se.

Those skilled in the art will also appreciate that an antenna in accordance with the present invention may be mounted in any location and is not limited to those mounting locations described herein. The invention in its broader aspects is therefore not limited to the specific details, representative apparatus and method, and illustrative examples shown and described. Accordingly, departures may be made from such details without departing from the spirit and scope of applicants' general inventive concept.

What is claimed is:

1. A method of determining a relative phase relationship between antenna elements comprising:
applying an applied signal to the antenna elements;
obtaining coupled signals from the antenna elements correlated to the applied signal;
electrically modifying a first of the coupled signals in a predetermined manner;
generating a first set of data correlated to an unmodified second of the coupled signals that has a generally constant phase and the electrically modified first of the coupled signals;
further electrically modifying the first coupled signal in a second predetermined manner;
generating a second set of data correlated to the unmodified second coupled signal and the further electrically modified coupled signal; and
determining the relative phase relationship between the antenna elements from the first and second set of data.

2. The method of claim 1, further comprising using a switch to select one of the coupled signals.

3. The method of claim 1, wherein electrically modifying the first of the coupled signals further comprises delaying a phase of the first signal.

4. The method of claim 1, wherein electrically modifying the first of the coupled signals further comprises delaying the first signal in phase by about 85 to about 95 degrees.

5. The method of claim 1, wherein electrically modifying the first of the coupled signals further comprises routing the first signal to a detector.

6. The method of claim 1, further comprising using a gain/ phase detector to generate the first set of data.

7. The method of claim 1, further comprising using a gain/ phase detector to generate the second set of data.

8. The method of claim 1, further comprising automatically adjusting signal wave propagation in response to determining the relative phase relationship.

9. The method of claim 1, wherein applying the applied signal further comprises using a multi-pole antenna element.

10. The method of claim 1, further comprising calibrating a first signal of the coupled signals.

11. The method of claim 1, further comprising using a vector attenuator to modify the first of the coupled signals.

12. The method of claim 1, wherein determining the relative phase relationship further comprises adding about 180 degrees to a vector attenuator setting.

13. The method of claim 1, further comprising using a summer to generate the first and second sets of data.

14. The method of claim 1 wherein determining the relative phase relationship further comprises retrieving a stored vector attenuator setting.

15. The method of claim 1, wherein generating a first set of data or generating a second set of data further comprises using a power detector.

16. A method for determining a relative phase relationship between antenna elements comprising:
applying an applied signal to the antenna elements;
obtaining a plurality of first phase measurements corresponding to the applied signal at the antenna elements;
generating a first value indicative of the plurality of first phase measurements;
modifying one of the plurality of first phase measurements but leaving at least one of the phase measurements unmodified;
detecting a plurality of second phase measurements corresponding to the applied signal at the antenna elements, wherein the second phase measurements include the modified one of the plurality of first phase measurements and the unmodified one of the phase measurements;

generating a second value indicative of the plurality of second phase measurements; and comparing the first and second values to determine a relative signal phase measurement.

17. The method of claim 16, further comprising using a coupler to obtain the plurality of first phase measurements.

18. The method of claim 17, wherein modifying the one of the plurality of first phase measurements further comprises routing the one of the plurality of first phase measurements to a detector.

19. The method of claim 16, further comprising using a switch to select one of the first phase measurements.

20. The method of claim 16, wherein modifying the one of the plurality of first phase measurements further comprises delaying the phase of the one phase measurement.

21. The method of claim 16, wherein modifying the one of the plurality of first phase measurements further comprises delaying the one phase measurement in phase by about 85 to about 95 degrees.

22. The method of claim 16, wherein modifying the one of the plurality of first phase measurements further comprises routing the one of the plurality of first phase measurements to a switch.

23. The method of claim 16, wherein applying the applied signal to the antenna elements further comprises transmitting the applied signal from the antenna elements.

24. The method of claim 16, wherein applying the applied signal to the antenna elements further comprises receiving the applied signal at the antenna elements.

25. The method of claim 16, further comprising using a gain/phase detector to generate the first value.

26. The method of claim 16, further comprising using a gain/phase detector to generate the second value.

27. The method of claim 16, further comprising using multi-pole antenna elements.

28. The method of claim 16, further comprising automatically adjusting signal wave propagation in response to determining the relative phase relationship.

29. A method of determining a relative phase relationship between antenna elements comprising:

applying an applied signal to the antenna elements;

summing first and second coupled signals from the antenna elements to determine a combined amplitude measurement;

modifying the first coupled signal with a vector attenuator until the combined amplitude measurement is at a desired lowest level; and determining the relative phase relationship between the antenna elements from the vector attenuator setting used to modify the first coupled signal.

30. The method of claim 29, wherein determining the relative phase relationship further comprises adding about 180 degrees to the vector attenuator setting.

31. The method of claim 29, further comprising calibrating the first coupled signal.

32. The method of claim 29, further comprising using a switch to select at least one of the first and second coupled signals.

33. The method of claim 29, further comprising using a summer to sum the first and second coupled signals.

34. The method of claim 29, wherein modifying the first coupled signal includes processing 360 degrees of a cycle of the first coupled signal.

35. The method of claim 29, further comprising using a power detector to determine the combined amplitude measurement.

36. The method of claim 29, further comprising using muti-pole antenna elements.

37. The method of claim 29, further comprising automatically adjusting signal wave propagation in response to determining the relative phase relationship.

38. A method of determining a relative phase relationship between antenna elements comprising:

applying an applied signal to the antenna elements;

obtaining coupled signals from the antenna elements correlated to the applied signal;

electrically modifying a first of the coupled signals in a plurality of predetermined manners including electrically modifying the signals in an initial manner and electrically modifying the signals in an additional manner to generate a plurality of modified first coupled signals;

maintaining a second of the coupled signals in an unmodified state with an unmodified phase;

generating data correlated to the unmodified second of the coupled signals with the unmodified phase and the plurality of modified first coupled signals, including generating a first set of data associated with the signals modified in the initial manner and the unmodified second signals and including generating a second set of data associated with the signals modified in the additional manner and the unmodified second signals;

determining the relative phase relationship between the antenna elements from the generated first and second sets of data.

39. The method of claim 38, further comprising using a switch to select one of the coupled signals.

40. The method of claim 38, wherein electrically modifying the first of the coupled signals further comprises delaying a phase of the first signal.

41. The method of claim 38, further comprising using a gain/phase detector to generate the data.

42. The method of claim 38, further comprising automatically adjusting signal wave propagation in response to determining the relative phase relationship.

43. The method of claim 38, further comprising using a vector attenuator to electrically modify the first of the coupled signals.

44. The method of claim 38, further comprising using a power detector to generate the data.

45. A method of determining a relative phase relationship between antenna columns comprising:

applying an applied signal to the antenna columns;

obtaining coupled signals from the antenna columns correlated to the applied signal;

electrically modifying a first of the coupled signals in a predetermined manner;

generating a first set of data correlated to an unmodified second of the coupled signals that has a generally constant phase and the electrically modified coupled signal;

further electrically modifying the first coupled signal in a second predetermined manner;

generating a second set of data correlated to the unmodified second coupled signal and the further electrically modified coupled signal; and determining the relative phase relationship between the antenna columns from the first and second set of data.

46. An antenna system for determining a relative phase relationship comprising:

a plurality of antenna elements applied to an applied signal;

an electrical circuit configured to modify, in a predetermined manner a first coupled signal of a plurality of coupled signals correlated to the applied signal and obtained from the antenna elements, and to further modify the once modified first coupled signal in a second predetermined manner to produce a further modified first coupled signal;

the circuit maintaining a second coupled signal unmodified and with a generally constant phase;

a detector configured to generate a first set of data correlated to the once modified first coupled signal and the unmodified second coupled signal, and to generate a second set of data correlated to the unmodified second coupled signal and the further modified first coupled signal; and a controller in communication with the electrical circuit and the detector, the controller configured to determine the relative phase relationship between the antenna channels from the first and second sets of data.

47. The antenna system of claim 46, further comprising a coupler configured to couple at least one of the first and second coupled signals.

48. The antenna system of claim 46, further comprising a switch configured to select one of the coupled signals.

49. The antenna system of claim 46, wherein the electrical circuit delays a phase of the first signal.

50. The antenna system of claim 46, wherein the electrical circuit delays the first signal in phase by about 85 to about 95 degrees.

51. The antenna system of claim 46, wherein the plurality of antenna elements transmit the applied signal.

52. The antenna system of claim 46, wherein the plurality of antenna elements receive the applied signal.

53. The antenna system of claim 46, further comprising a memory configured to store at least one of the first and second sets of data.

54. The antenna system of claim 46, wherein the detector includes a gain/phase detector.

55. The antenna system of claim 46, wherein the controller is further configured to automatically initiate adjustment of signal wave propagation in response to determining the relative phase relationship.

56. The antenna system of claim 46, wherein the plurality of antenna elements include multi-pole elements.

57. The antenna system of claim 46, wherein the electrical circuit includes a vector attenuator.

58. The antenna system of claim 46, wherein the controller determines the relative phase relationship by adding about 180 degrees to a vector attenuator setting.

59. The antenna system of claim 46, wherein the electrical circuit includes a summer.

60. The antenna system of claim 46, wherein the electrical circuit includes a power detector.

61. An antenna system for determining a relative phase relationship comprising:

a plurality of antenna elements applied to an applied signal;

an electrical circuit configured to modify, in a plurality of predetermined manners including in an initial manner and then in an additional manner, a first coupled signal of a plurality of coupled signals correlated to the applied signal and obtained from the antenna elements, and to further generate a plurality of modified first coupled signals;

the electrical circuit maintaining a second of the plurality of coupled signals in an unmodified state with an unmodified phase;

a detector configured to generate data correlated to the unmodified second of the plurality of coupled signals with the unmodified phase and the plurality of modified first coupled signals, including generating a first set of data associated with the signals modified in the initial manner and the unmodified second signals and including generating a second set of data associated with the signals modified in the additional manner and the unmodified second signals; and a controller in communication with the electrical circuit and the detector, the controller configured to determine the relative phase relationship between the antenna elements from the generated first and second sets of data.

62. An antenna system for determining a relative phase relationship between antenna elements comprising:

a plurality of antenna elements applied to an applied signal;

a summer configured to sum first and second coupled signals from the antenna elements to determine a combined amplitude measurement;

a vector attenuator configured to attenuate the first coupled signal until the combined amplitude measurement is at a desired lowest level; and a controller configured to determine the relative phase relationship between the antenna elements from a setting of the vector attenuator.

63. The antenna system of claim 62, wherein the controller is further configured to automatically initiate adjustment of signal wave propagation in response to determining the relative phase relationship.

64. The antenna system of claim 62, wherein the plurality of antenna elements include multi-pole elements.

65. The antenna system of claim 62, wherein the controller determines the relative phase relationship by adding about 180 degrees to the setting of the vector attenuator.

66. The antenna system of claim 62, further comprising a power detector configured to detect the combined amplitude measurement.

* * * * *